United States Patent [19]
Landman et al.

[11] Patent Number: 5,973,710
[45] Date of Patent: Oct. 26, 1999

[54] METHOD AND APPARATUS FOR PRINTING ON PASSPORTS AND THE LIKE

[75] Inventors: Avi Landman, Kiriat Motzkin; Jacob (Jack) Hassan, Tel-Aviv; Eli Rozen, Herzlia, all of Israel

[73] Assignee: SUPERCOM, Ltd., Kfar-Saba, Israel

[21] Appl. No.: 08/440,911

[22] Filed: May 15, 1995

[30] Foreign Application Priority Data

Apr. 13, 1995 [IL] Israel ........................................ 113358

[51] Int. Cl.$^6$ ................ B41J 2/39; B41J 2/395; B41J 2/385; B41J 2/415
[52] U.S. Cl. ................ 347/140; 347/141; 399/223; 399/330
[58] Field of Search ................ 347/88, 51, 103, 347/139, 213, 154, 140, 141; 355/271; 430/48; 399/50, 53, 302, 223, 330, 336, 67, 341, 342, 339, 66, 308

[56] References Cited

U.S. PATENT DOCUMENTS

| | | | |
|---|---|---|---|
| Re. 32,056 | 12/1985 | Granzow et al. ............... | 250/432 R |
| 3,013,878 | 12/1961 | Dessauer ....................... | 430/126 |
| 3,068,140 | 12/1962 | Biddle ........................... | 156/227 |
| 3,444,732 | 5/1969 | Robbins et al. ................ | 219/243 |
| 3,811,828 | 5/1974 | Ohta et al. .................... | 219/216 |
| 3,826,701 | 7/1974 | Miller ........................... | 159/359 |
| 3,925,139 | 12/1975 | Simmons ....................... | 219/243 |
| 4,243,458 | 1/1981 | Giulie . | |
| 4,389,438 | 6/1983 | Ohtsuki et al. ................ | 428/35.9 |
| 4,560,426 | 12/1985 | Moran et al. .................. | 156/64 |
| 4,687,526 | 8/1987 | Wilfert .......................... | 347/224 |
| 4,923,556 | 5/1990 | Kettelhoit et al. ............ | 219/468 |
| 4,928,996 | 5/1990 | Oshikoshi et al. ............ | 283/109 |
| 4,987,146 | 1/1991 | Rohde et al. .................. | 514/397 |
| 4,992,833 | 2/1991 | Derimiggio ................... | 399/308 |
| 5,058,926 | 10/1991 | Drower . | |
| 5,065,183 | 11/1991 | Morojuji et al. . | |
| 5,121,343 | 6/1992 | Faris ............................. | 395/111 |
| 5,211,424 | 5/1993 | Bliss ............................. | 281/15.1 |
| 5,261,987 | 11/1993 | Luening et al. ................ | 156/235 |
| 5,306,381 | 4/1994 | Nakazawa et al. ............ | 399/69 |
| 5,320,387 | 6/1994 | Carlson ......................... | 283/75 |
| 5,532,724 | 7/1996 | Inagaki et al. ................ | 347/213 |
| 5,568,170 | 10/1996 | Hirano et al. ................. | 347/51 |

FOREIGN PATENT DOCUMENTS

| | | |
|---|---|---|
| 0 195 104 A1 | 9/1986 | European Pat. Off. . |
| 0195104 | 9/1986 | European Pat. Off. . |
| 253 338 | 7/1987 | European Pat. Off. . |
| 0 232 709 A1 | 8/1987 | European Pat. Off. . |
| 0 412 520 A2 | 2/1991 | European Pat. Off. . |

(List continued on next page.)

OTHER PUBLICATIONS

EPO Search Report dated Sep. 19, 1996 for PCT/US 96/05084.
Grant & Hackh's Chemical Dictionary, 5th ed. Roger Grant and Claire Grant. p. 531. McGraw–Hill, 1987.
International Publication No. WO 90/05640.
International Publication No. WO 93/25391.
International Publication No. WO 94/03333.

*Primary Examiner*—John Barlow
*Assistant Examiner*—Raquel Yvette Gordon
*Attorney, Agent, or Firm*—Kane, Dalsimer, Sullivan, Kurucz, Levy, Eisele and Richard, LLP

[57] ABSTRACT

Graphic matter, such as words and images, is printed on a document in bound form, such as passport, by forming the graphic matter by laser printing steps on a temporary substrate and provisionally setting the graphic matter thus formed on the temporary substrate. Thereafter, the temporary substrate is juxtaposed with its face carrying the image in contact with the rear face of a transparent substrate, and the image is transferred to the rear face of this latter. Then the transparent substrate is juxtaposed to the final substrate that is intended to carry the image, with its rear face in contact with the front face of the final substrate, and the two substrates are laminated together, so that the image remains enclosed in the laminate and is visible from the front face of the transparent substrate as if it were printed on the final substrate.

23 Claims, 5 Drawing Sheets

FOREIGN PATENT DOCUMENTS

| | | |
|---|---|---|
| 0 457 579 A1 | 11/1991 | European Pat. Off. . |
| 553 508 | 11/1992 | European Pat. Off. . |
| 0 531 888 A2 | 3/1993 | European Pat. Off. . |
| 295 05 969 U | 6/1995 | Germany . |
| 29505969 U | 6/1995 | Germany . |
| 61-295578 | 12/1986 | Japan . |
| 291769 | 11/1996 | Taiwan . |
| 2267058 | 5/1992 | United Kingdom . |
| 2 273 466 | 6/1994 | United Kingdom . |
| 2 281 535 | 3/1995 | United Kingdom . |
| WO 9005640 | of 1990 | WIPO . |
| WO 93 25391 | of 1993 | WIPO . |
| WO 93/12940 | 7/1993 | WIPO . |
| WO 9403333 | of 1994 | WIPO . |
| WO 95/06567 | 3/1995 | WIPO . |

5,973,710

METHOD AND APPARATUS FOR PRINTING ON PASSPORTS AND THE LIKE

FIELD OF THE INVENTION

This invention relates to a printing method and apparatus for printing graphic matter and textual matter, generally including identifying photographs, on substrates bound in booklet form, particularly passports and the like.

BACKGROUND OF THE INVENTION

Graphic matter printed on passports and like documents in bound form, for instance but not necessarily in booklet form, generally includes identifying photographs, particularly color photographs, accompanied by identifying data. For this purpose, the laser printing process and laser printing machines are widely used.

Basically, the laser printing process comprises, as a first step, defining the subject matter to be printed in the form of an array of signals that can be used to control the printing machine. A common way of doing this consists in scanning the subject matter to be printed and registering the results of the scanning in a processor's memory, in the form of an array of digital signals. Said signals control the emission of laser rays from a laser source. The laser beams impinge on a cylinder in a pattern controlled by the said signals and electrostatically charge the surface of said metal cylinder at selectively predetermined spots. The selectively electrostatically charged cylinder passes in the vicinity of a reservoir of coloring matter in powder form. The coloring matter particles are attracted to the aforesaid selectively charged spots of said cylinder and form thereon the desired pattern. A print substrate is then passed into contact with the metal cylinder and the pattern formed by the color particles is deposited thereon. This operation is repeated for each color if a multicolor print is desired, usually four times to provide the basic colors magenta, cyan and yellow plus black (black will hereinafter be considered to be a color), to produce a complete colored image. At this stage a colored image has been formed on the print substrate. In order to stabilize the image, the print substrate is passed between heated rollers, which fix or set the print so that it is permanent and stable.

This process is quite effective for a number of applications, but it encounters difficulties, hitherto unsolved, when it is necessary to print on a substrate that is not in the form of a free sheet, but is in bound e.g. in the form a booklet, typically a passport or similar bound document. It would be highly desirable to print on a passport or like document, after it has already been bound in booklet form, the passport holder's photograph, signature, and/or other printed information. However, this is not possible with conventional color laser printing techniques. Other difficulties would arise, should the print substrate have a surface which is not absorbent with respect to the colors: the coloring matter is then partly if not totally transferred from the print substrate to the heat-setting rollers.

Copending Israeli patent application No. 111426, of the present applicant, describes and claims a method for printing on substrates in booklet form, which comprises the following steps:

1—providing a set of instructions, which reverses the original subject matter to be printed to define a reversed subject matter file;

2—providing a temporary substrate, the surface of which is substantially non-absorbent and non-adhesive for the coloring matters to be used for the printing;

3—depositing on said temporary substrate coloring matters, whereby to form thereon said reversed subject matter, by the appropriate steps of the conventional laser printing method;

4—provisionally setting said reversed subject matter by radiant heat;

5—juxtaposing said temporary substrate face-to-face with the final printing substrate;

6—transferring the reversed subject matter from said temporary to said final substrate, whereby said reversed subject matter is reversed and reproduces said original subject matter on said final substrate; and 7—setting said reproduced original subject matter on said final substrate by the application of pressure and optionally heat.

Said process, however, is difficult to carry out and does not provide the desired printing quality, whenever the final substrate does not have a surface that is fully suitable for receiving the reproduced original subject matter and permitting it to be set thereon. This occurs relatively often when said substrate is part of a booklet, particularly a passport, and more particularly when the print is to be effected on the inside of a booklet or passport cover. The cover must have a certain stiffness and is made of a material which possesses it, and, even it is covered by a sheet of paper adhesively connected thereto, its surface irregularities render it unsuitable as substrate for the aforesaid or other known printing methods. On the other hand, printing on the inside of the cover may be preferable or even necessary when the inner sheets are too light or otherwise unsuitable for printing pictures thereon.

It is a purpose of this invention to overcome the aforesaid difficulties and to make it possible satisfactorily to print subject matter, including multicolor subject matter such as data and photographs, on substrates that are part of booklets, particularly of passports and the like.

It is another purpose of this invention to provide a method for printing subject matter, including identifying data and photographs and the like, on the inside of the covers or on any other page of bound substrates, such as passports and the like.

It is a further purpose of this invention to provide an apparatus for achieving the aforesaid results, which apparatus is simple and not expensive to make nor difficult to use.

Other purposes and advantages of this invention will appear as the description proceeds.

SUMMARY OF THE INVENTION

In this application, the terms "substrate" or "printing substrate", without further specification, include any backing on which printing is effected, regardless of its form and composition, be it e.g. uncoated or coated paper, plastic or any other sheet material, or a page of a booklet or other bound object intended to carry printing on pages or other parts thereof. The terms "picture" or "image" or "subject matter", as used herein, synonimously indicate any kind of printable or printed subject matter, and therefore comprise, among other things, pictures representing persons or objects, portraits, photographs, letters, words, signs, signatures, data, and any figures or images or graphic symbols that may be carried by a substrate of any kind. In many cases to which this invention is applied, the picture comprises a portrait of the owner of a document in booklet form and words, OCR, numbers and the like, that contain information relevant to the identity of said owner and to the character, validity period, and other features of the document itself.

The method according to the invention comprises the following steps:

1—providing a set of signals, particularly digital signals, such as a computer file, a frame grabber, a memory buffer or the like, defining the subject matter to be printed (which will be synonimously called hereinafter "the picture" or "the image" or "the original picture or image" or "image file");

2—providing a temporary or intermediate substrate, the surface of which is substantially non-absorbent and non-adhesive for the coloring matters to be used for the printing or at least is considerably less adhesive and/or absorbent for said coloring matters than the transparent substrate, mentioned hereinafter;

3—depositing on said temporary substrate coloring matters, whereby to produce thereon said original image, by the appropriate steps of the conventional laser printing method;

4—provisionally setting said image without the application of pressure, preferably by radiant heat or dielectric or microwave heating;

5—juxtaposing said temporary substrate with its face carrying said image in contact with the rear face of a transparent printing substrate;

6—transferring said image from said temporary substrate to said transparent substrate rear face, whereby the said image is applied to said transparent substrate rear face and the image is visible, in normal form, through said transparent substrate from the front face thereof and reversed from the rear face;

7—juxtaposing said transparent substrate to the final substrate that is intended to carry the image, with the rear face of said transparent substrate in contact with the front face of said final substrate; and 8—hot or cold laminating said transparent substrate in contact with the front face of said final substrate, permanently to bond them, while said image becomes enclosed in the laminate and visible through said transparent substrate as if printed on said final substrate.

The setting of the image occurs to a substantial degree as a consequence of the transfer from the temporary to the transparent substrate and is preferably completed in the lamination of the transparent substrate to the final substrate. The transparent substrate may be part of the bound structure, e.g. but not necessarily a booklet, of which the final substrate is a part, or it may be a separate sheet. Its rear face is, as stated above, the face that is intended to be juxtaposed and bound to the final substrate; its front face is the opposite face, which will remain free and from which the image will be visible. The front face is preferably smooth and shiny, while the rear face preferably has a non-smooth finish that facilitates the adhesion and the absorption of the coloring matter of the print, and/or may be covered with a thin layer of adhesive matter. It may be made, for example, of polyester, e.g. polyester sheet, such as DuPont's Mylar (™) and have a thickness from 10 to 70 μ.

The intermediate or temporary substrate should have such a surface, that it is possible to transfer from it to the transparent substrate colors matter that has been provisionally not without the application of pressure, e.g. by radiant heat. Such transfer is effected by the application of pressure, and, possibly, moderate heat, under conditions that are sufficiently mild not to damage the transparent substrate. Setting of the print to a significant degree, though not necessarily complete, occurs in the transfer operation. The temporary substrate should have a smooth surface, non-absorbent for the colors used in the laser printing. Silicone coated papers have such surfaces. A preferred example is paper SBL 42 MGA SILOX 8L/0.

The final setting of the image may be carried out by the application of pressure and optionally heat during the laminating operation itself, viz. be a consequence of the laminating conditions. However, since the picture is protected, once the lamination has occurred, by the transparent sheet, the setting conditions may be mild. An adhesive layer may also be applied to the transparent substrate, over the whole rear face thereof, to facilitate the transfer of the image to said substrate. In this case the setting conditions may be particularly mild. The presence of an adhesive layer on the rear face of the transparent substrate, before transferring the picture to it, does not substantially influence the lamination, since such a layer will be extensively covered by the coloring matter of the picture.

Laminating temperatures are influenced by the nature of the transparent substrate and the presence or absence of adhesive between the transparent and the final substrates, and may vary in general from 40 to 160° C.

The final substrate may be a page of a booklet, but will be, in many cases to which this invention is applied, the inside of the cover of a passport or like identification document.

The apparatus according to the invention comprises two components, which may and often will not be structurally connected. The first component is a laser printer, which is characterized in that the print substrate used (which, when the method of the invention is applied, is a temporary substrate), carrying the image, is passed through a heat-setting section in which the printout is provisionally heat-set without the application of pressure, preferably by the application of radiant heat or microwave heating, but otherwise may be any type of known laser printer. The second component is an apparatus for carrying out two operations: transferring the image from the temporary substrate onto the transparent substrate; and laminating this latter to the final substrate. Both operations are carried out by applying pressure and, if required, heat, to the juxtaposed substrates, by means of rollers or pressure plates. Since temperature and possibly pressure conditions will be different in the two operations, a separate apparatus unit will conveniently be used for each of them.

Booklets and documents, such as passports and other identification documents, are part of the invention.

DETAILED DESCRIPTION OF PREFERRED EMBODIMENTS

Figure 1:
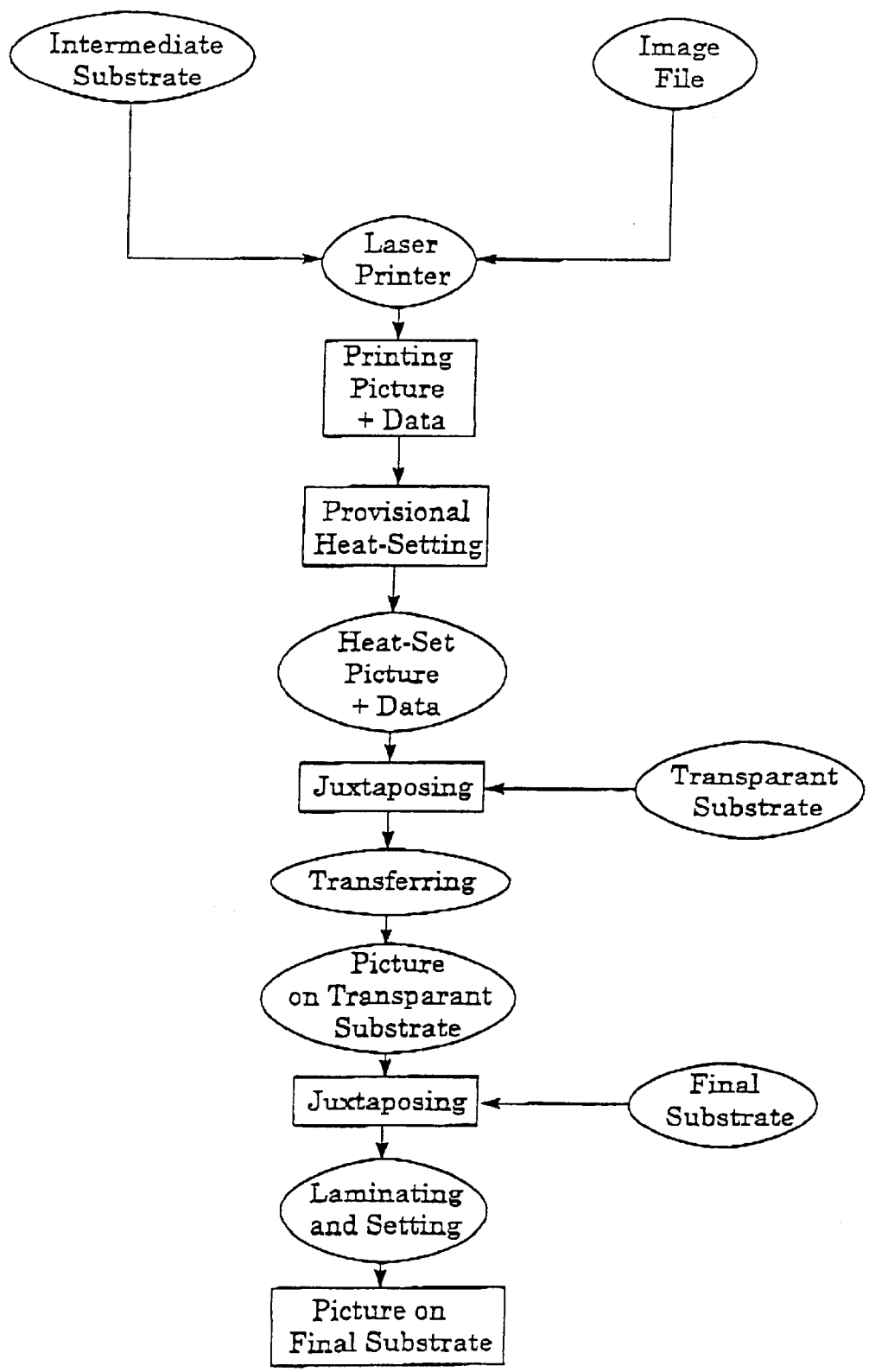
FIG. 1 is a flow diagram schematizing the method of the invention.

FIG. 1 is a flow diagram representing the method of the invention. As seen therein, the image file, no matter how obtained (e.g. from scanning, from composing pictures with data, from a frame grabber, from a video camera or from a buffer memory) is registered in the memory of a general purpose or special computer which controls the laser printer.

An intermediate substrate is fed to the laser printer. This intermediate substrate must have a surface which is considerably less adhesive and/or absorbent to the colors used in the printing than the transparent substrate, as hereinbefore set forth. An example of intermediate substrates are papers coated with silicones or Teflon, such as are used for applying to them, or storage and transport, self-adhesive stickers, but not limited, to which papers the silicone coating imparts a smooth, non-adhesive-retaining surface to facilitate the removal of the stickers. The choice of the intermediate substrate is influenced by the transparent substrate to be used, since it is required that the capability of the intermediate substrate of capturing and/or retaining the printing colors to be used be considerably less than that of the rear face of the transparent substrate.

The intermediate substrate is fed to the laser printer and the image file is printed on the said substrate with various colors in such patterns as to form an image in the conventional way in which this operation is carried out in laser printers. Any type of laser printer can be used for this purpose. After the formation of the image, however, the setting is not carried out as in a conventional laser printer, but is carried out by radiant or IR or microwave heating, thus producing, without the application of pressure, a provisionally heat-set image.

By "reversed image" or "reverse image" is meant herein an image that, when applied to a transparent substrate, will be seen, from the side of the transparent substrate opposite to that to which it has been applied, as the original or "direct" image. The reverse image would also be seen as the direct image if reflected in a mirror, and therefore could also be called the "specular" image. Said provisional setting is only partial and not as complete as the setting normally carried out in laser printers, but is sufficient for the image to be stable enough to permit carrying out the following steps of the process of the invention. Before the provisional setting, on the other hand, the image is quite labile and would not stand the manipulations required by the invention.

The intermediate substrate, carrying the provisionally heat-set image, is juxtaposed to the rear face of the transparent substrate. The "rear face" is the face of the transparent substrate opposite to the "front face", e.g. the face from which the image is intended to be viewed at the end of the process. This operation, as has been said, does not occur in the laser printer but it may be a completely manual operation or it may occur in a different part of the apparatus according to the invention, which can be completely separated from the structural viewpoint from the laser printer, or can be in some way combined with it. At this stage the image is located between the intermediate substrate and the rear face of the transparent substrate—it is sandwiched, it may be said, therebetween. To the juxtaposed intermediate and transparent substrates, pressure and, if required, moderate heat, such as will not damage the transparent substrate, are applied to transfer the image to this latter, in which operation the original image becomes visible from the front face of the transparent substrate. In this operation, the transparent substrate may be bound in the booklet, e.g. the passport, to which the invention is applied, or it may be a separate sheet. In both cases pressure and, if required, heat, can be applied to the juxtaposed substrates by means of pressure plates, rollers or other means. Once the image has been transferred to the transparent substrate, the temporary substrate is removed leaving the image on the rear face of the transparent substrate. Finally, the transparent substrate is juxtaposed with its rear face to the final substrate, and pressure and, optionally, heat is applied to laminate the transparent substrate to the final substrate, the image being enclosed between the two and visible from the front face of the transparent substrate.

Figure 2:
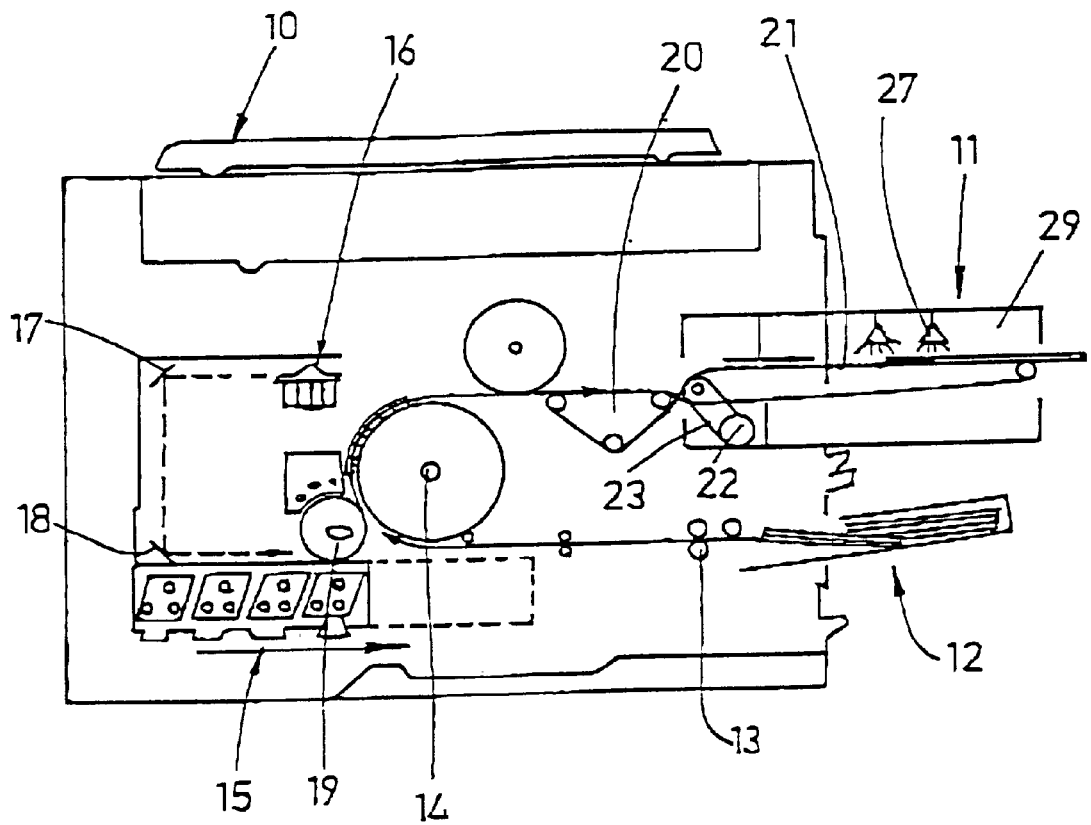
FIG. 2 is a schematic cross-section of the first component of an apparatus according to an embodiment of the invention.
Figure 3:
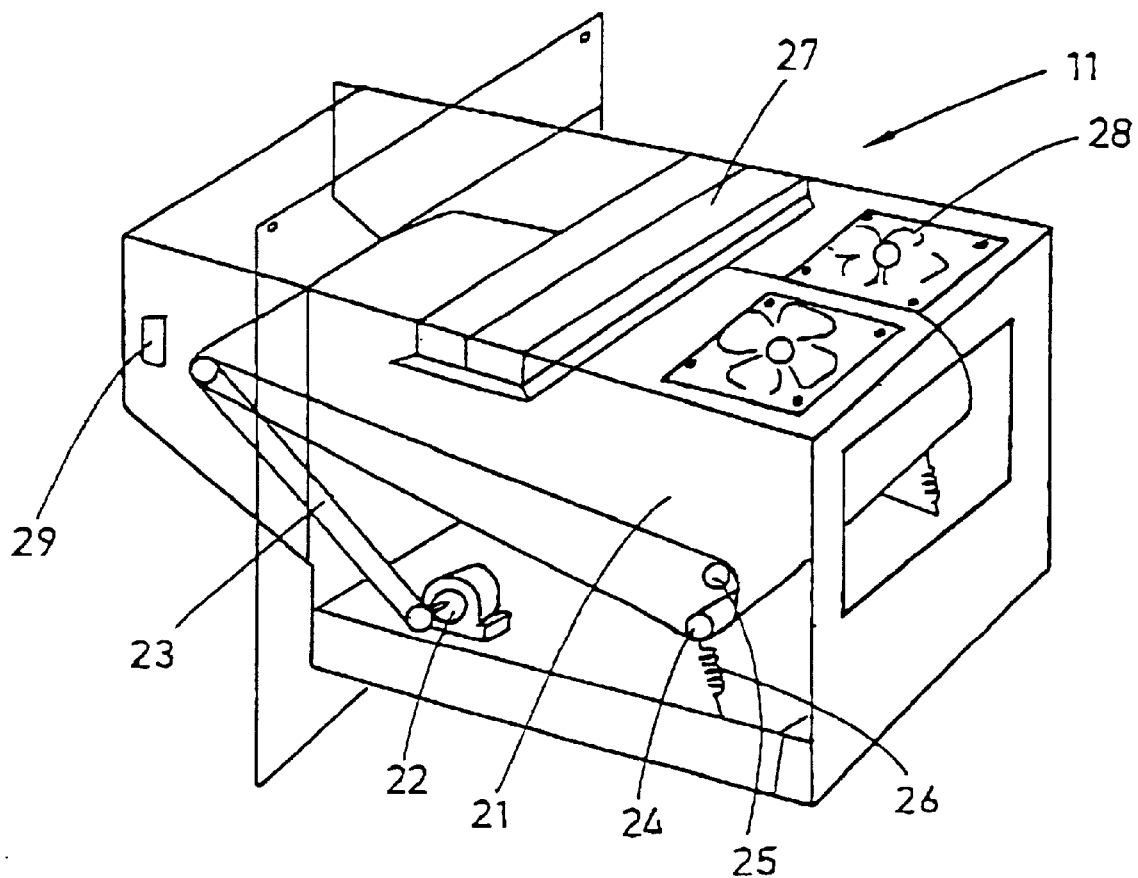
FIG. 3 schematically illustrates the heat-setting section of the apparatus of FIG. 2.

FIG. 2 schematically illustrates a laser printer according to the invention. The laser printer is generally indicated at 10 and may be any conventional laser printer except for the heat-setting portion, which is indicated at 11. The conventional part of the laser printer structure is well known to persons skilled in the art. It comprises a feed section 12 from which sheets are fed by means of a group of rollers 13 to a drum 14. Printing colors are contained in powder form in containers 15. Four containers are indicated in the drawing, since it is assumed that the printing is multicolor printing and is carried out in the three basic colors, magenta, cyan and yellow, plus black. Conventional means are provided for shifting containers 15 so that each of them may come into contact with drum 14 at the appropriate moments and transfer its coloring matter onto said drum. A laser source, not shown, directs a laser beam, controlled by digital control means, onto an octagonal mirror 16, from which the beam is deviated according to a program and successively reflected by mirrors 17 and 18 to impinge on a drum 19, according to the patterns determined by the image file through the controlling processor, which is not shown. The colors are captured by drum 19 according to said patterns. Drums 14 and 19 rotate in mutual contact and the image is transferred to the temporary substrate that has been fed to drum 14. This operation is repeated as many times as is required, generally 3 or 4 times, depending on whether three elementary colors, or three such colors plus black, are used in defining the image. Thereafter, the print substrate, with the image formed thereon, but not yet set and still in a labile state, passes through belt conveyor 20 to the provisional setting area 11, better illustrated in FIG. 3. All the operations described so far and the apparatus means for carrying them out are conventional and well known to persons skilled in the art. As an example of laser printer which comprises all the elements so far described, one may cite CLC-350 by CANON.

The setting area comprises a conveyor belt 21 which transports the temporary substrate with the image, which is driven by a motor 22 through a transmission chain 23, and is guided by rollers 24 and 25, its tension being adjusted by controlling the distance between said rollers by means of a spring 26. A paper sensor 29 signals the arrival of a temporary substrate. Sources of radiant heat, e.g. halogen lamps, or microwave source, 27 effect the provisional heat-setting of the image on the temporary substrate. Fans 28 are conveniently provided to aerate the setting area 11.

Figure 4:
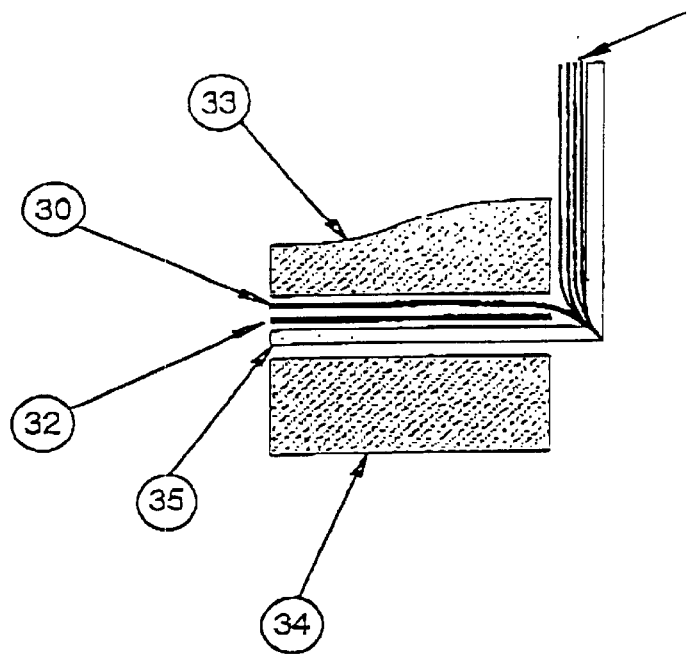
FIG. 4 schematically illustrates the transfer of the (picture)image from the temporary to the transparent substrate in an embodiment of the invention.

The temporary substrates, with the provisionally heat-set image, may be discharged from conveyor belt 21 in any convenient way and juxtaposed to the rear face of the transparent substrate and the image is transferred to said rear face. FIG. 4 illustrates one way of carrying out this operation, though different ways are readily available to persons skilled in the art. In the embodiment of FIG. 4, transparent substrate 30 is bound in a booklet, e.g. a passport, 31, adjacent to the cover 35 of this latter, the inner face of which is, in this case, the final substrate. The rear face of the transparent substrate 30 faces the cover 35. Temporary substrate 32 is juxtaposed to said rear face, viz., in this case, it is inserted between transparent substrate 30 and cover 35. Plates or rollers 33 and 34 schematically indicate an apparatus for applying pressure, and, if required, moderate heat, to the juxtaposed temporary substrate and transparent substrates, to transfer the image from the former to the latter.

Figure 5:
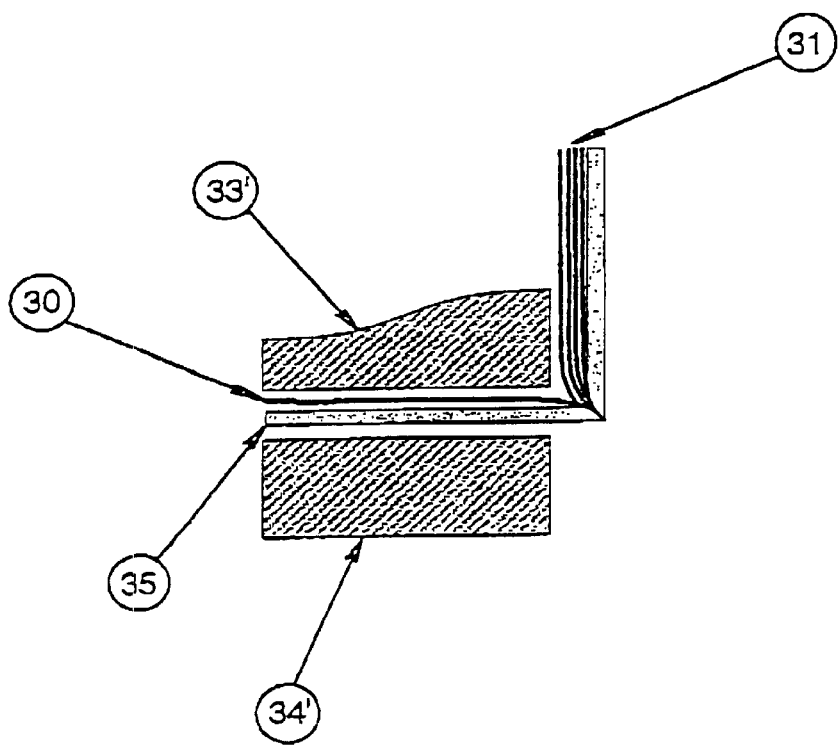
FIG. 5 schematically illustrates the transfer of the image from the transparent to the final substrate in the same embodiment.

Finally, as schematically illustrated in FIG. 5, the temporary substrate having been removed, transparent substrate 30 is juxtaposed to cover 35, which is the final substrate, and pressure and heat are applied thereto by means schematically indicated as plates or rollers 33' and 34', which may be different from those used in the preceding operation, to laminate said two substrates together. The image is now enclosed in the laminate, concurrently bound to both substrates, and is visible from the front face of the laminate, which is the front face of the transparent substrate. If it is desired to mechanize the last operations, various means, easily devised by a person skilled in the art, may be adopted.

Figure 6:
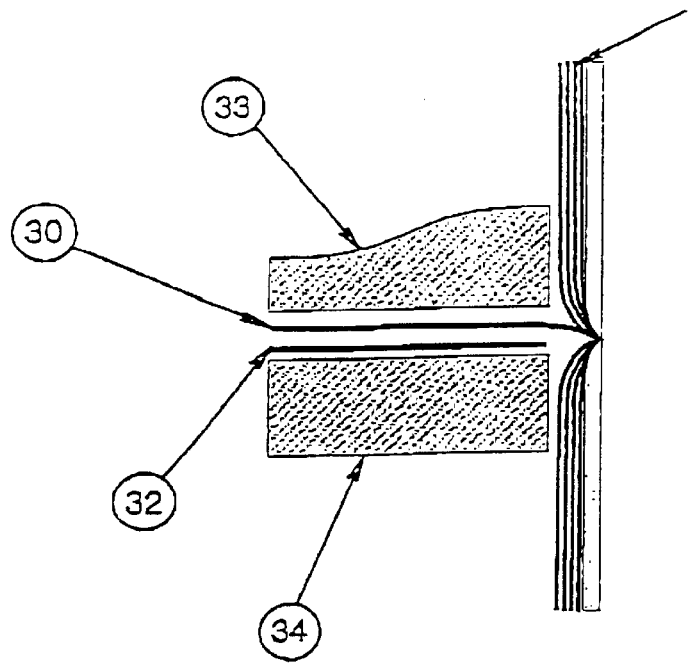
FIG. 6 schematically illustrates the transfer of the image from the temporary to the transparent substrate in another embodiment of the invention, wherein the final substrate is an internal page of the booklet.
Figure 7:
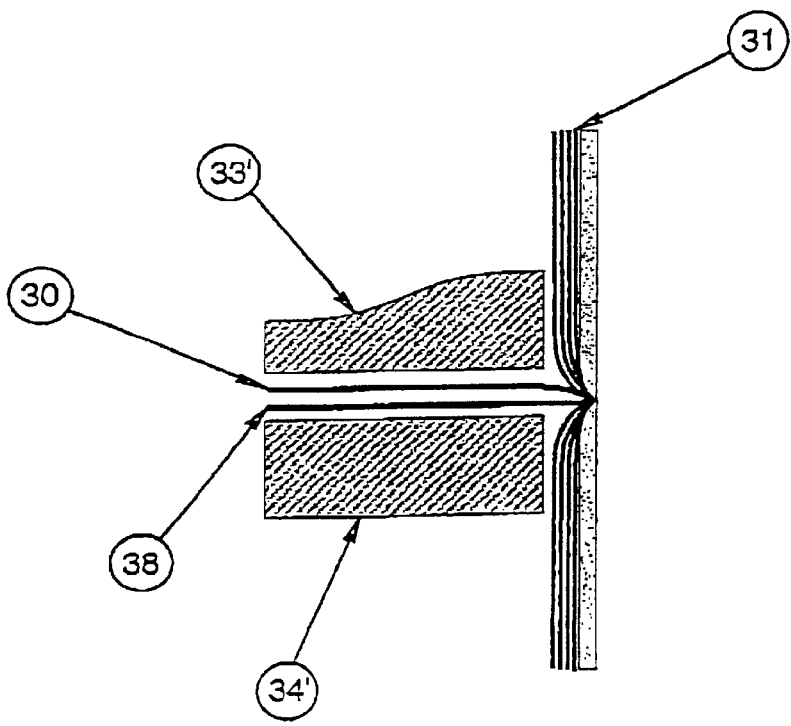
FIG. 7 schematically illustrates the transfer of the picture from the transparent to the final substrate in the embodiment of FIG. 6.

As has been noted hereinbefore, the final substrate need not be part of the cover of a booklet, but could be any intermediate sheet. This case is illustrated in FIGS. 6 and 7, which are analogous to FIGS. 4 and 5, but illustrate an embodiment in which the final substrate is not part of a booklet cover, but is an intermediate sheet of a booklet. In FIG. 6, the image is about to be transferred from the temporary substrate 32 to the transparent substrate 30. In FIG. 7, the transparent substrate 30 is about to be laminated to sheet 38, which, in this particular case, is one of the inner sheets of the booklet.

While embodiments of the invention have been described by way of illustration, it will be apparent that the invention may be carried out by persons skilled in the art with many modifications, variations and adaptations, without departing from its spirit or exceeding the scope of the claims.

We claim:

1. Method for printing on documents in booklet form; such as passports and other identification documents, which comprises the following steps:
    1) providing a set of signals defining an image to be printed;
    2) providing a temporary substrate having two faces;
    3) providing a transparent substrate having a front and a rear face;
    4) for each color comprised in said image to be printed:
        (a) causing a laser beam to impinge on a metal cylinder in a pattern controlled by said signals, whereby electrostatically to charge a surface of said cylinder at selectively predetermined spots;
        (b) passing said electrostatically charged cylinder close enough to a reservoir of coloring matter in powder form, having said color to be printed, for the coloring matter to be electrostatically attracted to said selectively predetermined spots and form thereon the pattern which said color forms in said images;
        (c) passing said temporary substrate in contact with said cylinder whereby said pattern is deposited on one face thereof;
        (d) repeating said operations (a) to (c) for all of said each color whereby, to form said image; said temporary substrate being substantially non-absorbent and non-adhesive, or at least considerably less adhesive and less absorbent for said coloring matters than said transparent substrate;
    5) provisionally setting said image without an application of pressure;
    6) placing one face of said temporary substrate in contact with said rear face of said transparent substrate;
    7) transferring said image from said temporary substrate to said rear face of said transparent substrate, whereby said image is applied to said transparent substrate rear face and the image is visible through said transparent substrate from said front face thereof and is visible in reverse from said rear face;
    8) providing a final substrate, that is intended to carry the image, said final substrate having a front face;
    9) juxtaposing said transparent substrate to said final substrate with said rear face of said transparent substrate in contact with said front face of said final substrate; and
    10) laminating the juxtaposed said transparent substrate and said final substrate, permanently to bind them, said image being enclosed between said two substrates and visible from said front face of said transparent substrate as if printed on said final substrate.

2. Printing method according to claim 1, further comprising the step of forming the final substrate as part of a booklet.

3. Printing method according to claim 4, further comprising the step of forming the final substrate as part of a cover or an intermediate sheet of a booklet.

4. Printing method according to claim 1, further comprising the step of setting of the image as a consequence of the laminating operation.

5. Printing method according to claim 4 further comprising the step of laminating the juxtaposed transparent substrate and final substrate at a temperature from 40° to 160° C.

6. Printing method according to claim 1, further comprising the step of partially setting the image while transferring the same from said temporary substrate to said transparent substrate.

7. Printing method according to claim 1, further comprising the step of binding the transparent substrate and the final substrate together in a document in bound form.

8. Printing method according to claim 1, further comprising the step of providing the transparent substrate as a separate sheet.

9. Printing method according to claim 1, further comprising the step of providing the front face of the transparent substrate smooth, while the rear face thereof has a non-smooth finish.

10. Printing method according to claim 1, further comprising the step of providing the transparent substrate with a rear face that is covered with a thin layer of adhesive matter.

11. Printing method according to claim 1, further comprising the step of providing the transparent substrate as a polyester sheet.

12. Printing method according to claim 1, further comprising the step of providing the transparent substrate with a thickness from 10 to 70 $\mu$.

13. Printing method according to claim 1, further comprising the step of carrying out the image transfer from the temporary substrate to the transparent substrate at a temperature from 40° to 180° C.

14. Printing method according to claim 1, further comprising the step of applying an adhesive layer to the transparent substrate, over the image, after transferring the image to said substrate and before laminating the juxtaposed transparent substrate and final transparent substrate.

15. Printing method according to claim 1, further comprising the step of providing the face of the temporary substrate on which the coloring matter are deposited with a surface which has at most a considerably weaker adhesion to said coloring matter than the transparent substrate.

16. Printing method according to claim 15, further comprising the step of providing the face of the temporary substrate on which the coloring matter are deposited as non-absorbent and non-adhesive for said coloring matters.

17. Printing method according to claim 1, further comprising the step of making the temporary substrate of paper coated with silicone.

18. Method according to claim 1, wherein the image on the temporary substrate is provisionally set by heating without an application of pressure, by means selected from the group consisting of radiant heating, dieletric heating and microwave heating.

19. Apparatus for printing images on substrates forming part of a booklet, which comprises a laser printer having a printing section, comprising a metal cylinder, means for electrostatically charging said cylinder in selectively predetermined spots, and means for passing the electrostatically charged cylinder close enough to reservoirs of colors in powder form for said colors to be electrostatically attracted to said cylinder and form an image thereon, and means for passing a temporary substrate in contact with said cylinder, whereby to deposit said image on said temporary substrate, a setting section, said section comprising means for passing a temporary printing substrate through said section, means for provisionally heat-setting said image by applying heat thereto without applying pressure, and further comprising means for transferring the image from the temporary substrate onto a transparent substrate and means for laminating said transparent substrate to a final substrate forming part of a booklet.

20. Apparatus according to claim 19, wherein the means for laminating the transparent to the final substrate are means for applying pressure and heat to the juxtaposed substrates.

21. Apparatus according to claim 20, wherein the means for applying pressure are rollers or pressure plates.

22. Apparatus according to claim 19, wherein the means for transferring the image from the temporary onto said transparent substrate are means for applying pressure and, if required, heat to the juxtaposed substrates.

23. Apparatus according to claim 19, wherein the means for provisionally heat-setting the image are radiant heating means or microwave means.

\* \* \* \* \*